No. 729,963. PATENTED JUNE 2, 1903.
E. ROGERS & C. W. SAGEE.
GLASS SHEARING DEVICE.
APPLICATION FILED APR. 21, 1902.
NO MODEL. 5 SHEETS—SHEET 1.
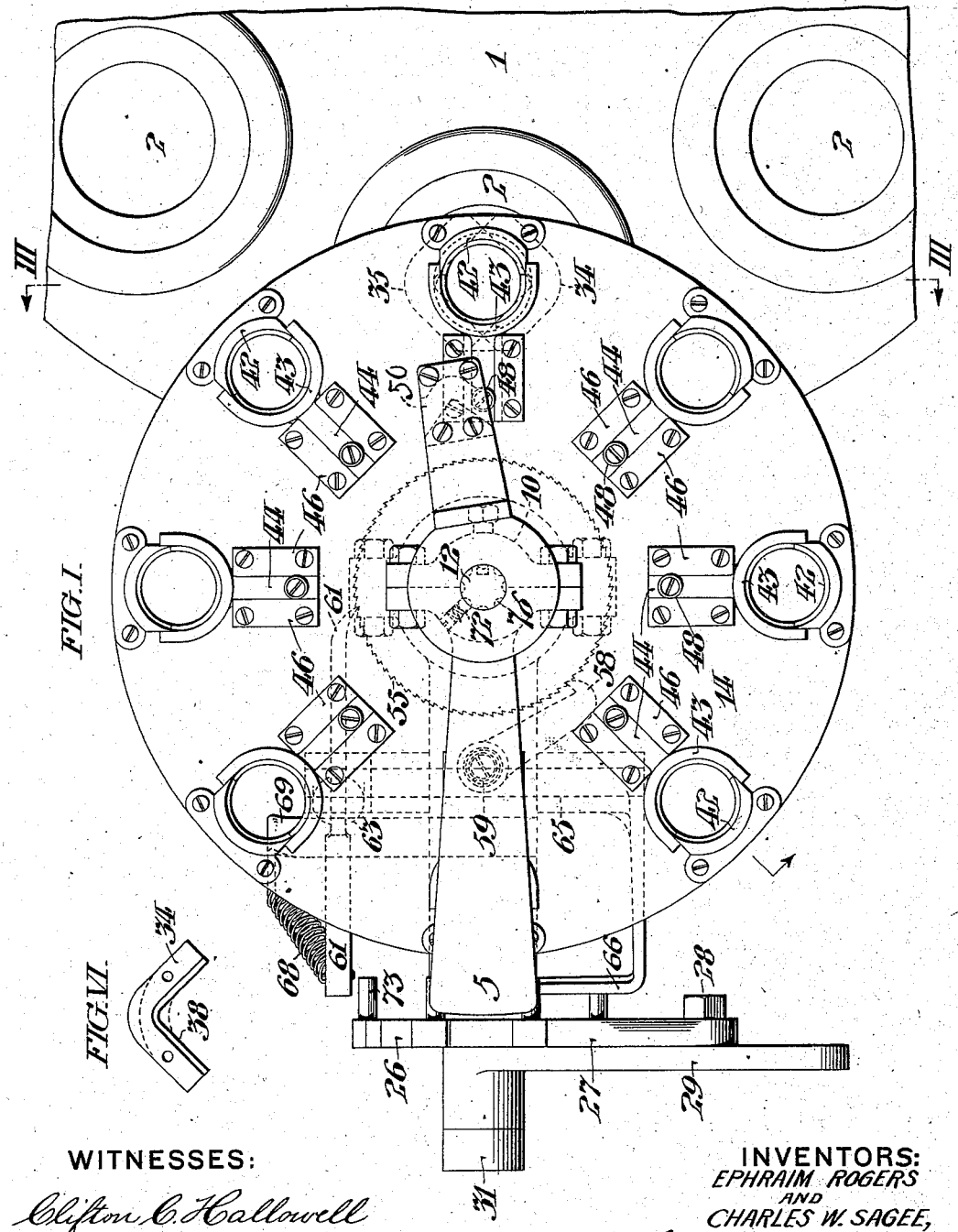
WITNESSES:
Clifton C. Hallowell
Edward Rittenhouse
INVENTORS:
EPHRAIM ROGERS
AND
CHARLES W. SAGEE,

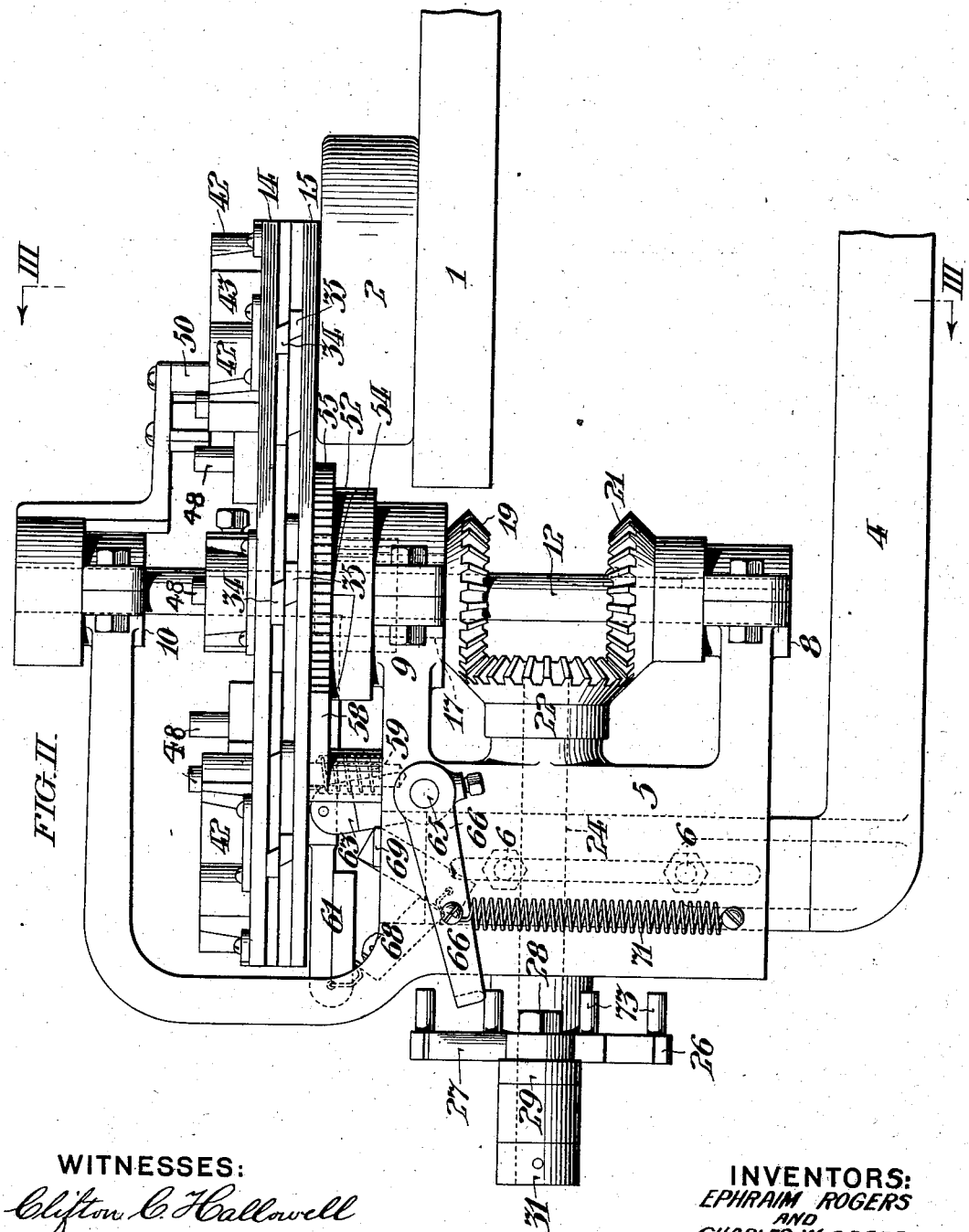

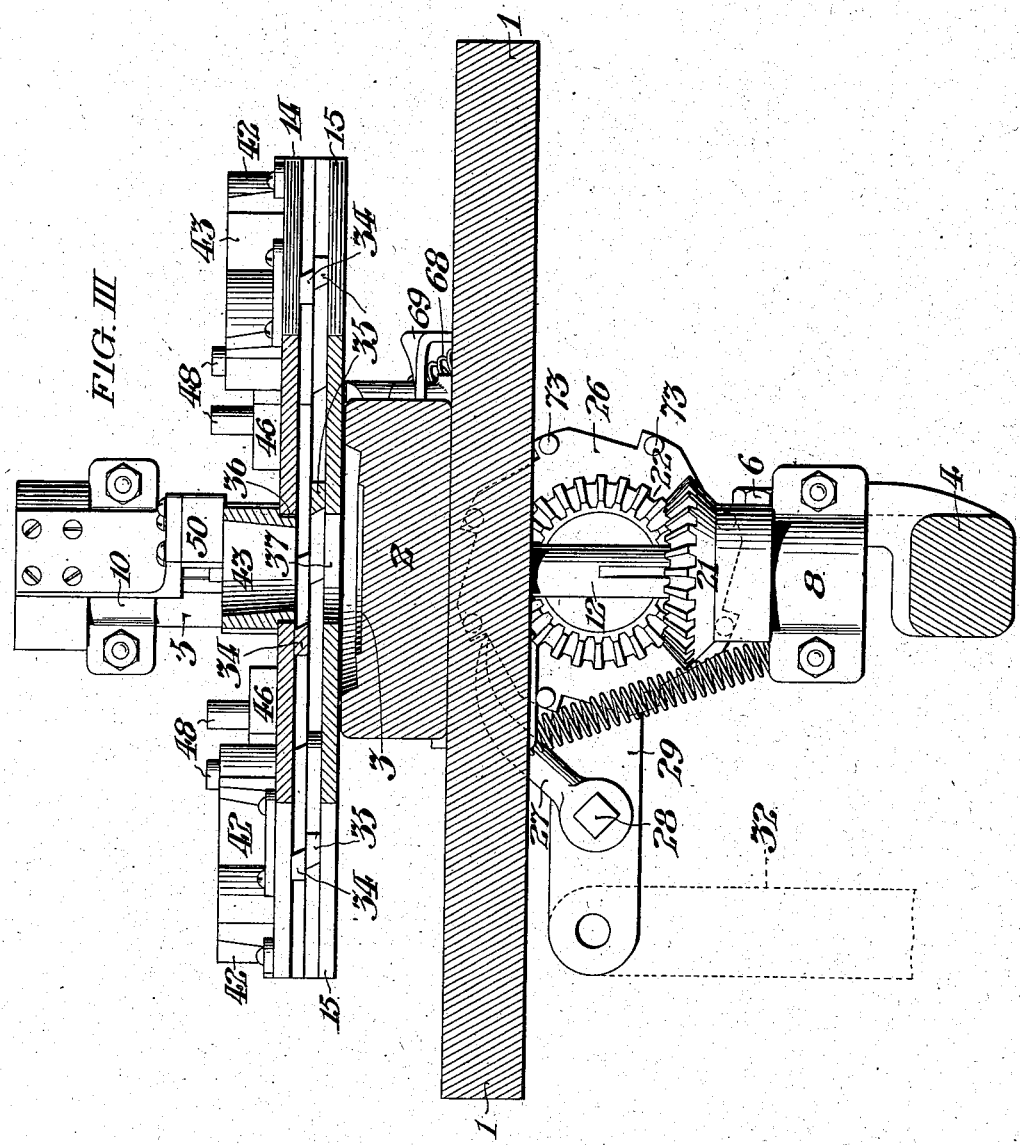

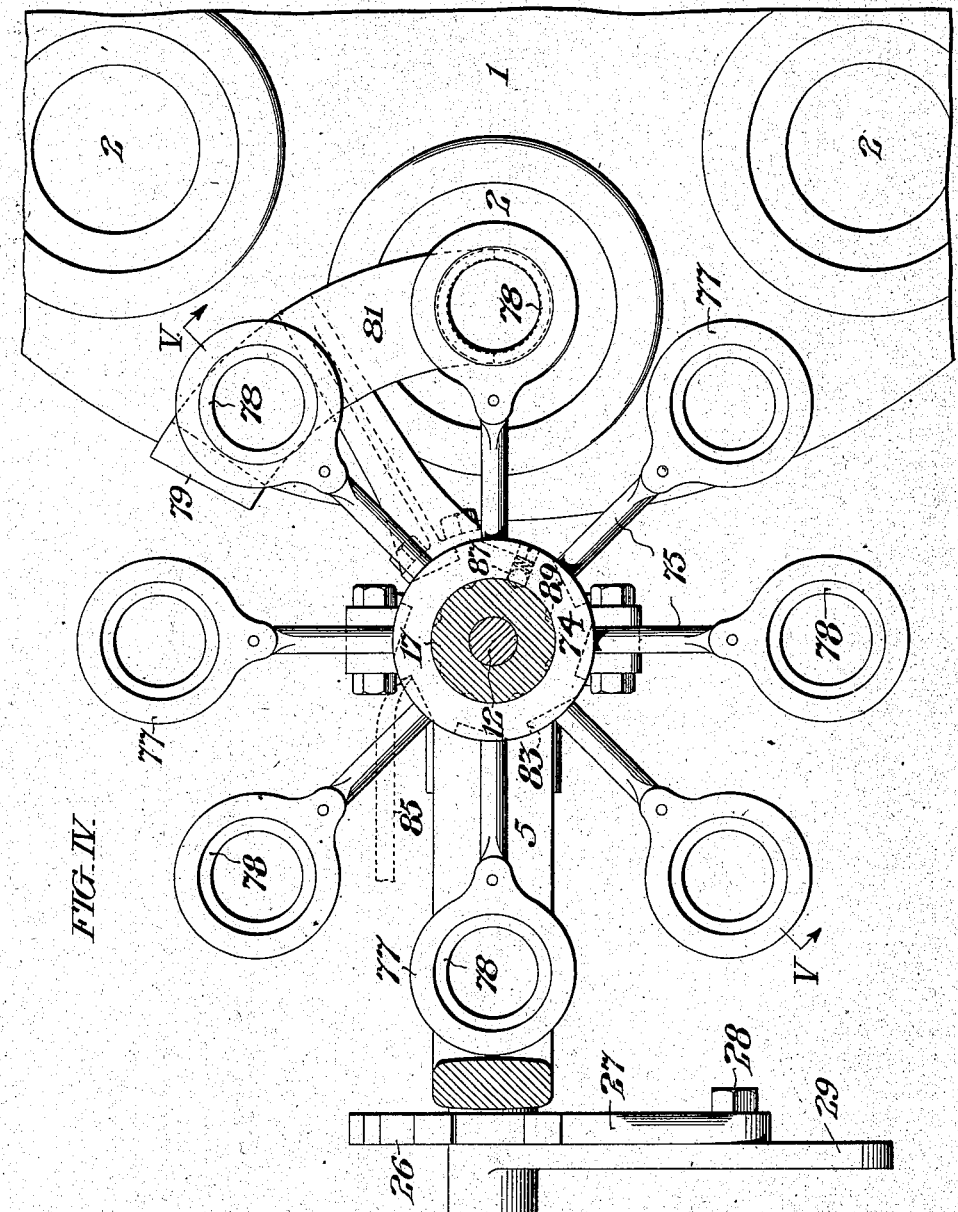

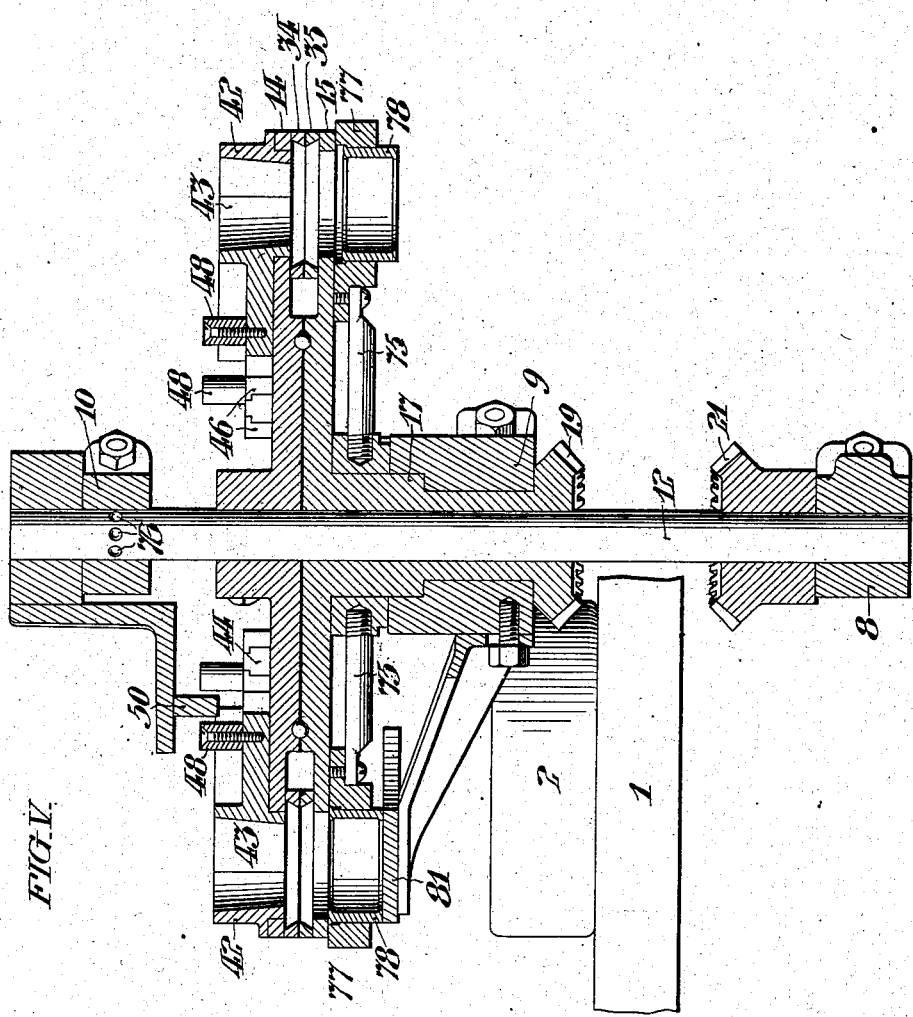

No. 729,963. Patented June 2, 1903.

UNITED STATES PATENT OFFICE.

EPHRAIM ROGERS AND CHARLES W. SAGEE, OF PHILADELPHIA, PENNSYLVANIA.

GLASS-SHEARING DEVICE.

SPECIFICATION forming part of Letters Patent No. 729,963, dated June 2, 1903.

Application filed April 21, 1902. Serial No. 103,864. (No model.)

*To all whom it may concern:*

Be it known that we, EPHRAIM ROGERS and CHARLES W. SAGEE, of Philadelphia, in the State of Pennsylvania, have invented certain new and useful Improvements in Glass-Shearing Devices, whereof the following is a specification, reference being had to the accompanying drawings.

It is the object of our invention to provide a device for attachment to or inclusion in a glass-forming machine adapted to automatically shear definite amounts of molten glass and supply them to a mold or molds comprised in said machine.

The form of our invention hereinafter described comprises two shear-disks comprising series of opposed shear-blades, said disks being provided with means to rotate them in opposite directions, so that a succession of shearing operations are performed by the encounter of the successive blades in said disks.

As hereinafter specified, our improvements comprise the combination, with opposed shear-blades, of means to automatically vary the amount of glass sheared by successive operations of said blades, the device being designed to make a series of cuts from a single gather of glass, beginning with a small amount and gradually increasing that amount in definite relation to the cooling and consequent stiffening of the glass.

Our invention also comprehends the various novel features of construction and arrangement hereinafter more definitely specified and claimed.

In the accompanying drawings, Figure I is a plan view showing a convenient embodiment of our shearing device in combination with a glass-forming machine. Fig. II is a side elevation of the device shown in Fig. I. Fig. III is a sectional view of said device, taken on the line III III in Figs. I and II. Fig. IV is a plan sectional view showing a modified form of our device. Fig. V is a sectional view of said modified device, taken on the line V V in Fig. IV. Fig. VI is a plan view of one of the shear-blades.

Referring to the form of our invention shown in Figs. I to III, inclusive, 1 is the rotary table of a glass-forming machine, provided with a series of molds 2, which are to be supplied with molten glass by the operation of our shearing device. It is to be understood that said machine comprises means to rotate said table 1, and thus successively present said molds 2 to receive the glass sheared by said device. The bracket-arm 4 is conveniently secured to the frame of said machine and serves to support the shear-frame 5, which is secured in vertically-adjustable relation therewith by means of the bolts 6. Said frame may therefore be vertically adjusted with respect to the molds 2 to variably determine the quantity of glass supplied to the latter, as hereinafter described. Said frame 5 comprises three bearings 8, 9, and 10, in which the vertical shaft 12 is mounted for rotation. The two shear-disks 14 15 are concentrically mounted upon said shaft 12, the disk 14 being fixed thereto and the disk 15 being fixed to the sleeve 17, arranged to rotate freely upon said shaft. Said sleeve 17 is provided with the bevel-gear 19, opposed to the bevel-gear 21, fixed upon the shaft 12, and said sleeve-gear 19 and said shaft-gear 21, together with their respective disks 14 and 15, are oppositely rotated by the intermediate bevel-gear 22, fixed upon the horizontal shaft 24, which is mounted to rotate in said frame 5. Said shaft 24 is rotated by means of the ratchet-wheel 26, which is fixed thereon in position to be engaged by the pawl 27, pivoted at 28 upon the lever 29, the latter being mounted to rock freely upon the shaft 24 between said ratchet-wheel 26 and the collar 31, which latter is fixed to the outer extremity of said shaft 24. Said lever 29 is conveniently connected by the link 32 (indicated in Fig. III) or otherwise with a movable part of the glass-forming machine, so as to be operated in definite relation with the latter to successively present and operate the eight pairs of shears carried by said disks 14 15 in respective association with the molds 2, which latter are successively presented beneath the shears by the rotation of the table 1. Said shears comprise opposed blades 34 and 35, which are respectively secured upon the shear-disks 14 and 15 at the margin of the respective openings 36 and 37 therein. As shown in Fig. VI, the cutting edges 38 of said shears may be angular or crescent shaped, but are preferably so recessed as to begin to cut at the margin of said openings and to finish cutting at the center thereof. Although we do not desire to limit ourselves to the precise shape of blades shown, we consider the same preferable in that it contracts the portion of the glass sheared instead of distending it in a ridge, as is the case with straight-edged shears. The arrangement of said disks and the gears which rotate them is such that the openings 36 and 37 in the respective disks are caused to register with the center of one of the molds 2, presented beneath said disks, as indicated in Fig. I, and the gather of glass being thrust through said registered openings 36 and 37 into contact with the surface 3 of the mold 2 the distance between the cutting plane of the blades and said surface 3 serves to limit and determine the amount of glass sheared from the gather at each operation.

In order to shape the glass gather in pointed form convenient for insertion between the shears, we provide the upper disk 14 with contractible funnels, each comprising a member 42, fixed upon the disk 14, and a complementary member 43, arranged to be reciprocated toward and away from said member 42 to alternately compress and release the gather inserted through the funnel, and thus give said gather a pointed form of less dimensions than the normal opening through the funnel. Each of said funnel members 43 is provided with a slide 44, fitted to reciprocate in slideways 46, fixed upon said disk 14, and said slides 44 are each provided with a roller 48, fitted to engage the cam 50, which latter is conveniently fixed upon the bearing 10 of the frame 5 and serves to reciprocate each shaping device as it passes beneath said cam.

An ordinary gather of glass will furnish, approximately, sixteen clippings, each sufficient to make a complete article; but as the glass becomes less plastic in accordance with its decrease in temperature it is necessary to gradually increase the amount of the successive clippings from the same gather. In the ordinary hand operation such variation in the successive clippings has been effected solely by the judgment and skill of the operator. We have, however, provided means to effect such variation automatically by varying the vertical distance of the shear-blades from the mold-surface 3 beneath them, which surface serves to limit the extent of the glass thrust between said blades. Such variation is conveniently effected as follows: Said disks 14 15 rest upon the rotary annular cam 52, which comprises a series of inclines fitted to the similar inclines of the stationary cam 54 in lowest position, as shown in Fig. II, at the beginning of the operation of shearing each gather. Said cam 52 is provided with the ratchet 55 and prevented from accidental displacement during the rotation of the shear-disks by the keeper-pawl 58, which is pressed into engagement with said ratchet 55 by the spring 59. (Indicated in Figs. I and II.) Said cam 52 is gradually rotated to uplift the opposed shear-disks 14 and 15 by the intermittent operation of the pawl 61 in definite relation to the rotation of said shear-disks. Said pawl 61 is pivoted to the arm 63, fixed upon one extremity of the rock-shaft 65, whose opposite extremity is provided with the lever-arm 66. Said pawl 61 is maintained in proper position to engage the ratchet 55 by means of the spring 68, attached to the extremity of the bar 69, which latter forms a stop against which the arm 63 is normally maintained by the spring 71, connecting the lever 66 with the frame 5. Said arm 66, rock-shaft 65, and pawl 58 are rocked in definite relation with the rotary movement of the shear-disks 14 and 15 by the series of pins 73, which project from the inner face of the ratchet-wheel 26 in position to successively encounter the extremity of said arm 66.

In the form of our invention shown the pawling mechanism, above described, is so proportioned and arranged that the cam 52 is rotatively progressed the extent of four teeth of the ratchet 55 in correspondence with such rotary movement of the disks 14 15 as suffices to bring the successive shear-blades in operative position with respect to the molds 2, and said ratchet being provided with eighty teeth twenty operations of the pawl 61 and twenty successive conjunctions of the shear-blades are had during the traverse of the cam 52 up the incline of the cam 54, whereupon said cam 52 and the shear-disks fall to their original level. Provision is thus made for twenty shearing operations with twenty gradually-increasing amounts of glass. However, it is to be understood that but approximately sixteen of said operations are utilized upon a single gather, the remaining operations being idle while the gathering-boy is procuring a new gather, which is presented when the shear-disks have fallen to their initial lowermost position.

It is to be noted that each pair of shear-blades is used but once during each rotation of the shear-disks and is cooled during the remainder of each rotation. The motion imparted to said disks 14 and 15 being intermittent, said disks rest with their openings 36 37 in registry for a sufficient length of time to permit the insertion of the gather therethrough, and accidental displacement of said disks is prevented by the spring-pressed detent 72 in the bearing 10, which successively engages the recesses 76 in the shaft 12, as indicated in Figs. I and V.

The form of our invention shown in Figs. IV and V is adapted for use when the article to be molded is of such size that but a single clipping may be sheared from each gather. In this form of our invention a spider-frame, comprising the hub 74 and radial arms 75, is mounted to rotate freely upon the sleeve 17, above the bearing 9, and said arms 75 are respectively provided with sockets 77, each loosely holding a bottomless cup 78. By the rotation of said spider-frame said cups 78 are caused to ride up the inclined end 79 of the plate 81 and to be uplifted to the extent of their vertical motion in the sockets 77, the upper and lower positions of said cups 78 being shown respectively at the left and right hand sides of Fig. V. Said hub 74 of the spider-frame is provided with ratchet-teeth 83 and arranged to be engaged by the pawl 85, and thereby intermittently rotated one-eighth revolution at each stroke of said pawl, the arrangement being such that said spider-frame comes to rest in the position shown in Fig. IV. Accidental displacement thereof is prevented by the spring-pressed detent 87, which is mounted in the bearing 9 and successively engages the recesses 89 in the sleeve 17.

The operation of the device is as follows: The gather being thrust through the funnel and between the shears into the cup 78 while the latter is in the position shown at the left-hand side of Fig. V, the plate 81 forms the bottom for said cup and serves to limit and determine the desired quantity of glass which is then sheared from the gather by the rotation of the shear-disks. The spider-frame being then rotated one-eighth revolution by the pawl 85 carries the cup 78, filled with glass, into registry with the mold 2, as indicated at the right-hand side of Fig. IV, whereupon the cup 78 falls to the limit of its movement in the socket 77 and deposits its quota of glass within the mold.

We do not desire to limit ourselves to the precise details of construction and arrangement which we have shown and described, as it is obvious that various modifications may be made therein without departing from the spirit of our invention.

We claim—

1. In a glass-shearing device, the combination with a pair of shearing-blades and means to actuate said blades; of means to automatically vary the quantity of glass sheared by said blades at successive operations thereof, substantially as set forth.

2. In a glass-shearing device, the combination with a pair of shearing-blades and means to actuate said blades; of means to automatically increase the amount of glass sheared by said blades during successive shearing operations, substantially as set forth.

3. In a glass-shearing device, the combination with opposed rotary shearing-blades having relatively fixed axes; of means to rotate said blades; and, means distinct from said blades arranged to shape the glass for insertion between said blades, substantially as set forth.

4. In a glass-shearing device, the combination with opposed rotary shearing-blades having relatively fixed axes; of means to rotate said blades; and, means distinct from said blades arranged to compress the glass for insertion between said blades, substantially as set forth.

5. In a glass-shearing device, the combination with opposed shearing-blades arranged to rotate on coincident axes; of means to rotate said blades; and, means distinct from said blades arranged to shape the glass for insertion between said blades, substantially as set forth.

6. In a glass-shearing device, the combination with a pair of shear-disks arranged to completely rotate with respect to each other; of a series of openings through said disks; a series of shear-blades upon each of said disks adjoining the openings therein; and, means to continuously rotate said disks in relatively opposite directions, substantially as set forth.

7. In a glass-shearing device, the combination with a pair of shear-disks; of means to rotate said disks in relatively opposite directions; a series of openings through said disks; a series of shear-blades upon each of said disks adjoining the openings therein; a surface opposed to the openings in said disks to limit the projection of glass through the latter; and means to increase the distance between said shears and said surface during successive shearing operations, in definite relation to the cooling of the glass, substantially as set forth.

8. The combination with a glass-forming machine comprising a series of molds mounted on a movable mold-carrier; of a shear-frame secured to said machine; a plurality of opposed shear-blades mounted to rotate on said frame; means to detain said shear-blades in successive registry with the molds of said machine; means to rotate said shear-blades on said frame; means to successively operate said blades in registry with the successive molds of said machine; and, means to variably determine the quantity of glass sheared by said blades at a single operation, substantially as set forth.

9. The combination with a glass-forming machine comprising a series of molds; of a shear-frame secured to said machine; a plurality of opposed shear-blades mounted on said frame; means to shift said shear-blades on said frame and successively operate them in registry with the successive molds of said machine; and means to increase the amount of glass sheared by said blades during successive shearing operations, substantially as set forth.

10. In a glass-shearing device, the combination with a pair of shear-disks; of means to rotate said disks in relatively opposite directions; and, means to gradually shift said disks in the direction of their axis of rotation, contemporaneously with their rotation, substantially as set forth.

11. The combination with a glass-forming machine comprising a mold; of a shear-frame support secured to said machine; a shear-frame mounted upon said support; means to secure said shear-frame upon said support in adjustable relation therewith; a pair of shear-disks; means to rotate said disks in relatively opposite directions; and, means to shift said disks along their axis of rotation and thereby vary the amounts of glass successively sheared by said disks, substantially as set forth.

12. The combination with a glass-forming machine comprising a series of molds mounted on a movable mold-carrier; of a shear-frame support secured to said machine; a shear-frame mounted upon said support; a shaft arranged to rotate in said frame; a pair of shear-disks concentrically mounted upon said shaft; a series of openings through said disks; a series of shear-blades upon each of said disks adjoining the openings therein; means to rotate said disks in relatively opposite directions; and means to gradually uplift said disks with respect to said molds, during successive shearing operations, substantially as set forth.

13. The combination with a glass-forming machine comprising a series of molds mounted on a movable mold-carrier; of a shear-frame support secured to said machine; a shear-frame mounted upon said support; a shaft arranged to rotate in said frame; a shear-disk fixed upon said shaft; a second shear-disk fixed upon a sleeve mounted to rotate upon said shaft in opposition to the first shear-disk; a gear engaged with said shaft; a gear fixed upon said sleeve; a gear intermediate of said shaft-gear and sleeve-gear and operatively connected therewith; and means to rotate said intermediate gear, substantially as set forth.

14. The combination with a glass-forming machine comprising a series of molds mounted on a movable mold-carrier; of a shear-frame support secured to said machine; a shear-frame mounted upon said support; a shaft arranged to rotate in said frame; a shear-disk fixed upon said shaft; a second shear-disk fixed upon a sleeve and mounted to rotate upon said shaft in opposition to the first shear-disk; a gear engaged with said shaft; a gear fixed upon said sleeve; a gear intermediate of said shaft-gear and sleeve-gear and operatively connected therewith; a shaft fixed in said intermediate gear; means to rotate said intermediate gear, to rotate said disks in relatively opposite directions; an annular cam fixed upon said shear-frame beneath said disk; a rotatable annular cam, fitted to said stationary cam and provided with ratchet-teeth; a pawl arranged to engage said ratchet-teeth and rotate said cam; and means operatively connecting said pawl with said intermediate gear-shaft, whereby said cam is shifted in definite relation with the rotation of said disks, substantially as set forth.

15. In a glass-shearing device, the combination with a pair of shearing-blades and means to actuate said blades; of means to shape the glass for insertion between said blades, comprising a contractible funnel adjoining said blades; and means to contract said funnel, substantially as set forth.

16. The combination with a pair of shearing-disks arranged to completely rotate with respect to each other; of a series of shear-openings through said disks; and, means to continuously rotate said disks in relatively opposite directions, substantially as set forth.

In testimony whereof we have hereunto signed our names, at Philadelphia, Pennsylvania, this 17th day of April, 1902.

EPHRAIM ROGERS.
CHARLES W. SAGEE.

Witnesses:
F. M. BROWER,
HUGH FITZPATRICK.